United States Patent
Huhn

[15] 3,704,020
[45] Nov. 28, 1972

[54] DOUBLE ACTING ROTARY MECHANICAL SEAL

[72] Inventor: Dieter Karl Wilhelm Huhn, Jarpstigen 20, S-161 40 Bromma, Sweden

[22] Filed: Dec. 7, 1970

[21] Appl. No.: 95,702

[52] U.S. Cl. ................................................ 277/62
[51] Int. Cl. ............................................. F16j 15/34
[58] Field of Search............277/3, 23, 25, 27, 58, 59, 277/65, 62, 63, 61

[56] References Cited

UNITED STATES PATENTS

| | | | |
|---|---|---|---|
| 2,215,034 | 9/1940 | Gorman | 277/62 |
| 2,777,702 | 1/1957 | Rodal | 277/3 |

*Primary Examiner*—William F. O'Dea
*Assistant Examiner*—Robert I. Smith
*Attorney*—Cushman, Darby & Cushman

[57] ABSTRACT

The disclosure herein describes a seal which prevents the entry of a fluid to be sealed from atmospheric into the seal gland should the pressure of the blocking medium fall below that of the fluid. The seal includes an annular piston which is axially displaceable on the seal's sleeve by the pressure of the fluid of the counterforce if the blocking medium should fail; the displacement of the piston allows the fluid to fill an annular space between the piston and the sleeve and to exert a hydrostatic pressure on the sleeve which balances the pressure of the medium and prevent sealing faces between blocking medium and fluid from separating. At the same time, the pressure on the sealing faces between the blocking medium and the atmosphere is also increased.

4 Claims, 1 Drawing Figure

PATENTED NOV 28 1972　　　3,704,020
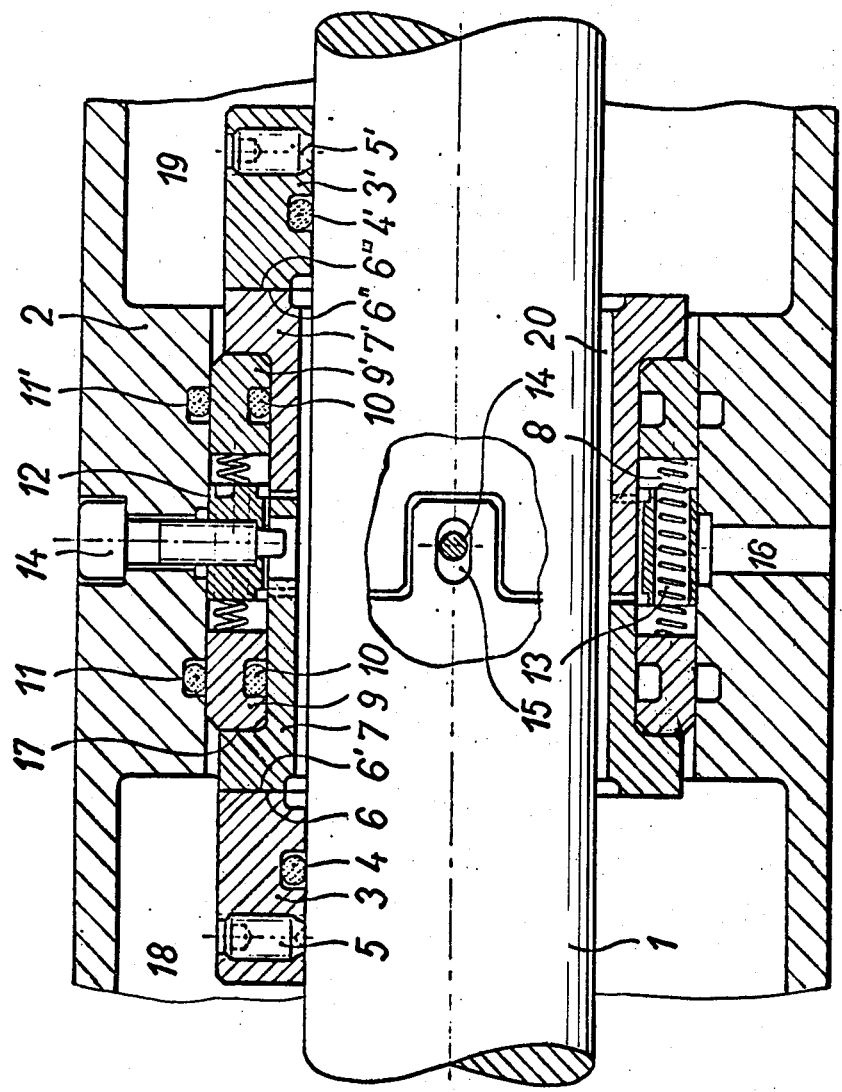
INVENTOR
Dieter Karl Wilhelm HUHN
Cushman, Darby & Cushman
ATTORNEYS

DOUBLE ACTING ROTARY MECHANICAL SEAL

The invention relates to a double-acting rotary mechanical seal to be used with a blocking medium between liquid to be sealed and atmosphere, and which will balance itself in case the blocking medium pressure should fall below that of the liquid to be sealed.

Rotary mechanical seals have been used extensively to seal fluids under pressure against other fluids or against atmosphere. Such seals normally seal between two radial faces, perpendicular to the rotating shaft, one being stationary, the other rotating with the shaft. One of the faces, the rotating or the stationary face, is usually spring loaded to provide a closing force. Both faces are sealed statically against their respective housing bore or shaft by means of O-rings, V-rings, etc.

Double-acting seals or double seals are assemblies of two seals arranged in various ways to suit the operating conditions. A blocking medium at a higher pressure than the process fluid is usually introduced into the gland space to insure confinement of toxic or highly volatile liquids.

The spring force which holds the sealing faces closed is not sufficient to overcome the force exerted against it from the hydrostatic pressure of the medium to be sealed, thus a blocking medium pressure acting on the sealing faces in the same direction as the spring force is required. In many installations such as pumps, compressors, autoclaves, reactors, etc., a service circulating unit is required to provide the high sealing pressure of the blocking medium. In actual operation of such systems it was observed that, more often than not, failures occurred in systems because the blocking medium pressure could not be kept at a level high enough to prevent the seal from opening. In some cases it was malfunction of the blocking medium pump, in others failure of operators to set the blocking medium pressure high enough to compensate for fluctuations in the process. The medium to be sealed leaked into the gland, through the second seal into the surrounding atmosphere or into pipe systems often not designed to withstand corrosive effects of the process medium. Various methods were tried to safeguard against such occurrences. Accumulators, self-acting solenoid valves, etc. were used. One known emergency seal consists of a pressure balance chamber in which the medium sealed can displace the blocking medium in case of failure of the blocking medium pressure supply and exert a hydrostatic force to keep the sealing faces closed. Such a balancing chamber must be sealed from the seal gland, usually employing O-rings, either between shaft and sealing ring in case of a rotating sealing ring, or between gland housing and sealing ring in case of a rotating counterface. These O-ring seals cannot be sized adequately for the pressure of the medium because they would exert a considerable radial pressure on the shaft or the housing, whichever the case may be, and thus impede the free axial movement of the sealing assembly.

This invention describes a seal without the foregoing disadvantages which prevents the entry of the medium to be sealed into the seal gland should the pressure of the blocking medium fall below that of the medium to be sealed. The basic principle of the invention is an annular piston which is displaced in axial direction by the pressure of the medium to be sealed if the counterforce of the blocking medium should fail. This displacement allows the medium to fill the annular space between the piston and the sealing ring and exert a hydrostatic pressure on the sealing ring which balances the pressure of the medium and prevents the sealing faces from separating. It also increases the spring pressure on the sealing faces between blocking medium and atmosphere and thus prevents a leakage of the blocking medium to the outside.

Following is a description of the principle of operation of the invention to be used in conjunction with attached schematic drawing:

A rotating shaft 1 extends through the wall of an apparatus housing 2. A rotating sealing ring 3, sealed statically against the shaft by means of an O-ring 4 is attached to the shaft with several set screws 5. Against the plane face 6 of the sealing ring 3 presses the plane face 6' of the sleeve 7 through the pressure exerted by compression springs 8 on piston 9. The rotating face 6 thus seals against the stationary face 6'. The piston 9 is sealed statically through O-ring 10 against the sleeve 7 and through O-ring 11 against the housing 2. A stop ring 12 nests compression springs 8 in axial holes 13 arranged on the whole circumference and also prevents a rotation of the sleeve 7 with respect to the housing 2 by means of stop screws 14 engaged in slots 15 of the sleeve 7. The blocking medium is circulated through the seal through holes 16 in the housing 2. The blocking medium completely fills the space between shaft 1 and sleeve 7, also between housing 2 and piston 9.

During normal operation, the pressure of the blocking medium being higher than the pressure of the medium to be sealed, the piston 9 is pressed against shoulder 17 of the sleeve 2. The blocking medium now fills the space between shaft 1 and housing 2. The medium to be sealed fills the space 18 between the shaft 1 and the housing 2 inside the seal assembly. If the pressure of the blocking medium falls below that of the medium to be sealed the sealing faces 6 and 6' normally separate (in ordinary double seal arrangements) and admit the medium into the seal gland.

In this invention the faces 6 and 6' will remain in contact because the medium will axially displace the piston 9 and press it against the face of the stop ring 12. The hydrostatic force of the medium exerted on face 17 of the sleeve 7 thus acts as a closing force on the sealing faces 6 and 6'. The inside and outside diameters of the sealing faces 6 and 6' is sized in relation to the outside diameter of sleeve 7 in such a way that a positive net resultant force in direction of the closure of the sealing faces 6 and 6' is achieved.

This is accomplished by making the outside diameter of sleeve 7 slightly smaller than the arithmetic mean of outside and inside diameters of the sealing faces 6 and 6'.

The other seal, sealing between blocking medium and space 19 between shaft 1 and housing 2 is arranged symmetrically in the same way as the foregoing seal. This has the advantage that any displacement of piston 9 results in an increase of the compression springs 8 on the piston 9' and thus increases the closing pressure between faces 6'' and 6''' if the pressure of the blocking medium fails.

What is claimed is:

1. A double-acting rotary mechanical seal to seal a fluid under pressure against another fluid or against atmosphere, comprising first and second rings fixed to a rotating shaft extending through a housing separating the fluid under pressure from the other fluid or the atmosphere, each said ring having a sealing face perpendicular to the shaft; a pair of sleeves extending around said shaft between said rings and having therebetween a gland space filled with a blocking medium, each said sleeve having an inner surface and an opposite outer sealing face perpendicular to the shaft and in contact engagement with an associated sealing face of said rings,; a pair of spring-loaded annular pistons each axially displaceable on an associated sleeve to contact an associated inner surface thereof; each said inner surface defining with its associated piston an annular gap therebetween when the pressure of the blocking medium falls below the pressure of the fluid to be sealed whereby the displacement of said piston relative to its associated inner surface allows the fluid under pressure to fill the annular gap and to exert a hydrostatic pressure on the inner surface of the sleeve and on its associated piston, the inner surfaces and outer sealing faces of each sleeve being so related in area to one another the hydrostatic pressure prevents each sealing face of the sleeve and each sealing face of the ring from separating.

2. A double-acting rotary mechanical seal as defined in claim 1 further comprising a series of compression springs, each spring having its opposite ends secured to said annular pistons to urge the same against said inner surfaces of said sleeves.

3. A double-acting rotary mechanical seal as defined in claim 1 wherein said stop means include a stop ring surrounding said sleeves and fixed to said housing, said stop ring having means for engaging said sleeves to prevent rotation thereof and provided with a series of axial openings for the passage of said compression springs therethrough.

4. A double-acting rotary mechanical seal as defined in claim 1 wherein the outside diameter of each sleeve is slightly smaller than the arithmetic mean of the inside and outside diameters of said sealing faces.

* * * * *